United States Patent [19]

Quin et al.

[11] Patent Number: 4,561,248

[45] Date of Patent: Dec. 31, 1985

[54] HYDRAULIC SHOCK-ABSORBING JACK

[75] Inventors: René Quin, Harkirchen, France; Paul Wiet, Randaberg, Norway; Jean-Louis Migliarese-Caputi, Paris, France

[73] Assignee: Compagnie Francaise des Petroles, Paris, France

[21] Appl. No.: 563,918

[22] Filed: Dec. 21, 1983

[30] Foreign Application Priority Data

Dec. 22, 1982 [FR] France ................... 82 21526

[51] Int. Cl.$^4$ ............................. F15B 15/22
[52] U.S. Cl. ................... 60/413; 91/170 R; 188/322.22
[58] Field of Search ........... 60/413, 469; 91/170, 91/183, 173; 92/129, 143, 85 B, 65, 60, 134; 188/313, 314, 322.22; 267/64.15, 64.27, 125

[56] References Cited

U.S. PATENT DOCUMENTS 2,649,842  8/1953  Caldwell et al. ............ 92/65
2,679,827  6/1954  Perdue ....................... 92/134

FOREIGN PATENT DOCUMENTS 0129910  8/1982  Japan ..................... 92/85 B

Primary Examiner—Robert E. Garrett
Assistant Examiner—John M. Husar
Attorney, Agent, or Firm—Sughrue, Mion, Zinn, Macpeak and Seas

[57] ABSTRACT

A hydraulic shock-absorbing jack particularly for use underwater comprises a cylinder 1 in which a piston 20 associated with an actuated rod 23 is slidable. The piston defines within the cylinder a first actuating chamber 6 provided with a first inlet 2 for actuating liquid and connected to an accumulator 7 of elastically variable volume, and a second actuating chamber 8 provided with a second inlet 3 for actuating liquid. The rod is mounted to be slidable relative to the piston such that, in the event of a shock applied to the rod which would otherwise cause an increase in the volume of the second chamber, the rod alone moves relative to the piston without affecting the volume of the second chamber. The rod is provided with an enlarged head 24 located in the first chamber and preventing its disengagement from the piston.

1 Claim, 5 Drawing Figures

HYDRAULIC SHOCK-ABSORBING JACK

BACKGROUND OF THE INVENTION

The present invention relates to a double-acting hydraulic jack which also has shock-absorbing functions.

Jacks of this type are known and consist of a cylinder assembly in which a piston can move, the piston being connected to an actuated rod and defining in the cylinder, on one side, a first actuating chamber for bringing the piston into the working position, provided with a first inlet for actuating liquid and connected to an accumulator of elastically variable volume, and, on the other side, a second actuating chamber for retracting the piston from its working position and provided with a second inlet for actuating liquid.

A disadvantage of this system is that in the event of a shock being applied to the actuated rod the rapid displacement of the piston generates an abrupt pressure drop in the second actuating chamber, thus risking producing an inflow of the external fluid surrounding the jack into the second actuating chamber. This risk is particularly great when the jack is submerged in an expanse of water, such as the sea, at a depth generating a high hydrostatic pressure.

This disadvantage can be mitigated by associating with the jack additional hydraulic equipment which, in the event of a shock, ensures that actuating liquid is supplied rapidly to the second actuating chamber, but this makes installation considerably more complicated.

SUMMARY OF THE INVENTION

According to the invention there is provided a shock-absorbing jack comprising an actuated rod, a cylinder and a piston for actuating the rod, which is slidable in the cylinder and which defines within the cylinder, on one side thereof, a first actuating chamber provided with a first inlet for actuating liquid and connected to an accumulator of elastically variable volume and, on the other side thereof, a second actuating chamber provided with a second inlet for actuating liquid, wherein the actuated rod is mounted so as to be slidable relative to the piston and is slidable axially in a leak-proof manner in an axial passage in the piston, the actuating rod having one of its ends located in the first actuating chamber and provided with a retention head, the shape of which prevents it from engaging in the axial passage in the piston.

In use of the above jack, in the event of a shock applied to the rod, the actuated rod will penetrate into the first actuating chamber without displacing the piston and therefore without modifying the pressure in the second actuating chamber.

BRIEF DESCRIPTION OF THE DRAWINGS

An embodiment of the invention, given by way of example only, will now be described with reference to the accompanying drawings.

In the drawings.

DETAILED DESCRIPTION OF THE PREFERRED EMBODIMENTS

Figure 1:
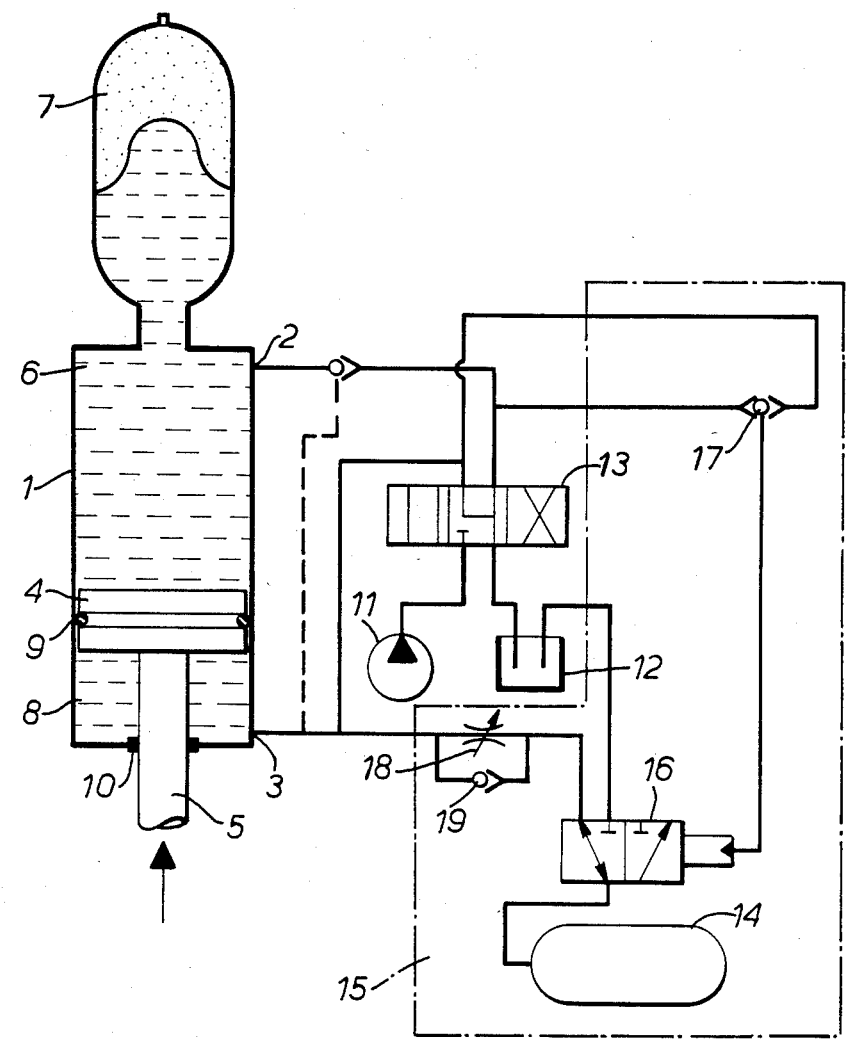
FIG. 1 shows diagrammatically a shock-absorbing jack of a known type.

The known shock-absorbing jack shown in FIG. 1 comprises a cylinder 1 provided at its axial ends respectively with a first inlet 2 and a second inlet 3. A piston 4 connected to an actuated rod 5 defines within the cylinder 1 a first actuating chamber 6, connected to the first inlet 2, and connected to an accumulator 7 of elastically variable volume, which is as shown of the oil/pneumatic type, and a second actuating chamber 8 connected to the second inlet 3. Leak-proofing between the piston 4 and the cylinder 1 is ensured by means of a gasket 9, whilst leak-proofing between the actuated rod 5 and the cylinder 1 at the entry of the rod into the latter is ensured by means of a gasket 10. The actuating fluid is, for example, oil.

The first inlet 2 is connected either to the outlet of a pump 11 or to a storage tank 12 by means of a distributor 13, whilst the second inlet 3 must be connectable not only to the pump 11 or the tank 12, but also to a flexible reservoir 14, thus requiring additional hydraulic equipment which is located within the dot-and-dash line 15 and comprising particularly, in addition to the reservoir 14, valves 16, 17 and 18 and a flap or one-way valve 19.

Figure 2:
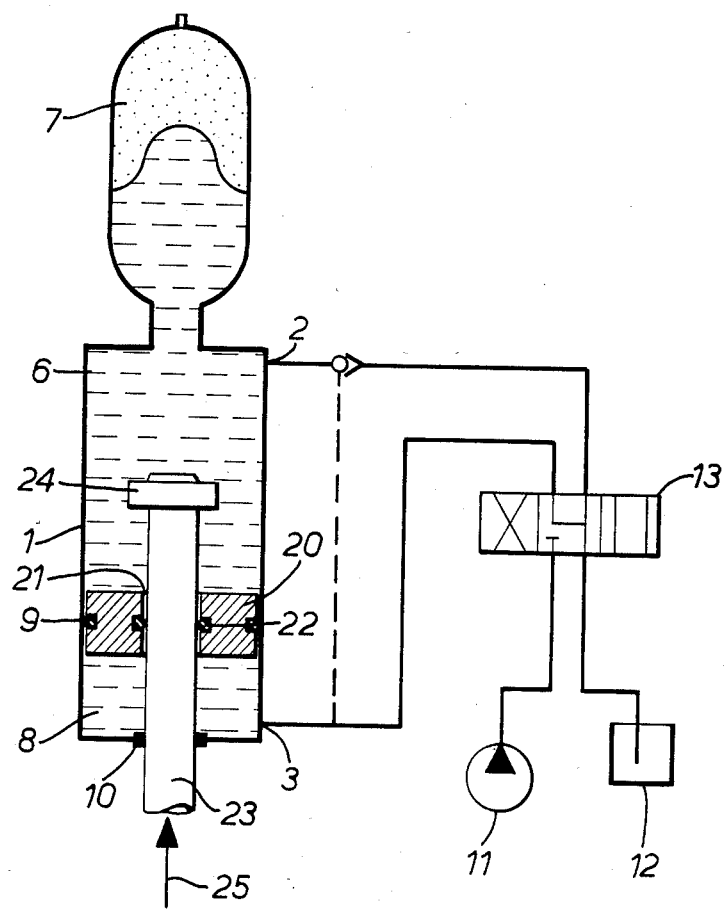
FIG. 2 shows diagrammatically an embodiment of a shock-absorbing jack according to the invention, and illustrated functioning as a shock-absorber.

In the jack according to the present invention, shown in FIG. 2 in which the same reference numerals have been retained for components similar to those of FIG. 1, there is, on the contrary, the possibility of connecting the inlet 3 merely to the pump 11 or to the tank 12 by means of the distributor 13. This simplification of the circuit results from a modification of the shock-absorbing jack, according to which the piston 4 of FIG. 1 is replaced by a piston 20 provided with an axial passage 21 bordered by a sealing gasket 22, and the actuated rod 5 of FIG. 1 is replaced by a rod 23 which is designed to slide in the axial passage 21, leak-proofing being provided by gasket 22. The rod 23 ends in the first chamber 6 in an enlarged head 24 which prevents the rod 23 from passing through the passage 21. It will be seen in FIG. 2 that the head 24 of the actuated rod 23 has been moved away from the piston 20 under the action of a shock received by the rod 23 in the direction of the arrow 25. The force consisting of the product of the pressure of the oil in the first chamber 6 and the cross-sectional area of the rod 23 tends to bring the head 24 back against the piston 20. The latter does not move, and the only volume which changes is the volume within the chamber 6, this variation in volume being compensated by a variation in the opposite direction of the volume of liquid in the accumulator 7.

Figure 3:
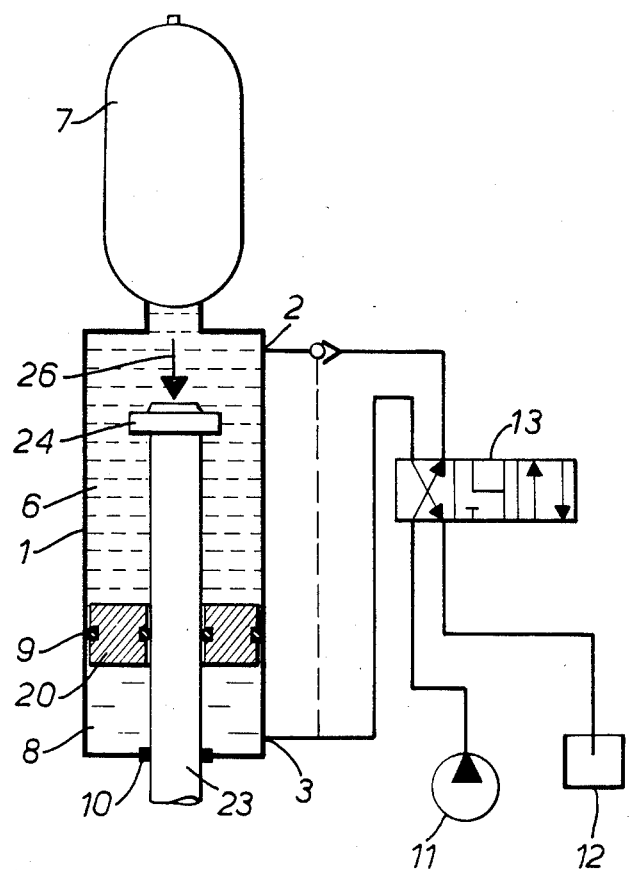
FIGS. 3 and 4 are diagrammatic views similar to that of FIG. 2, showing the jack respectively when the actuated rod is brought into the extended position and when the actuated rod is brought into the retracted position.

FIG. 3 shows how the rod 23 is displaced in the direction of arrow 26 towards its extended position, the inflow of actuating oil into the chamber 6 via the inlet 2 acting both on the piston 20 and on the rod 23 so as to lower the piston 20 as far as it will go and apply the head 24 on the piston 20.

Figure 4:
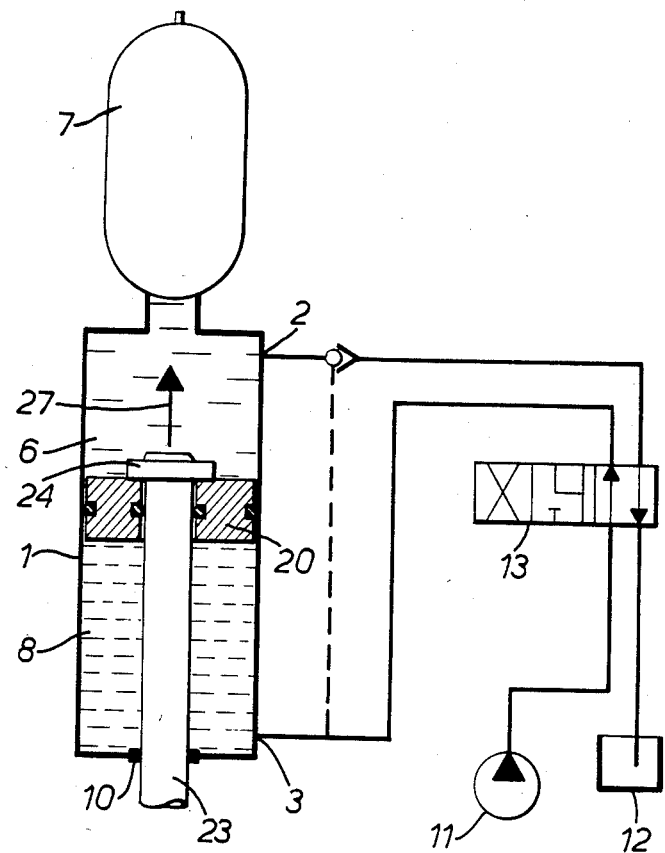

FIG. 4 shows the opposite displacement of the rod 23 in the direction of the arrow 27 in order to retract the rod which is moved by the piston 20 on which oil under pressure conveyed by the pump 11 into the second inlet 3 and the second chamber 8 then acts. The force acting on the rod 23 during this displacement is equal to the product of the pressure prevailing in the second chamber 8 and the difference in area between the cross-sections of the cylinder 1 and the rod 23.

Figure 5:
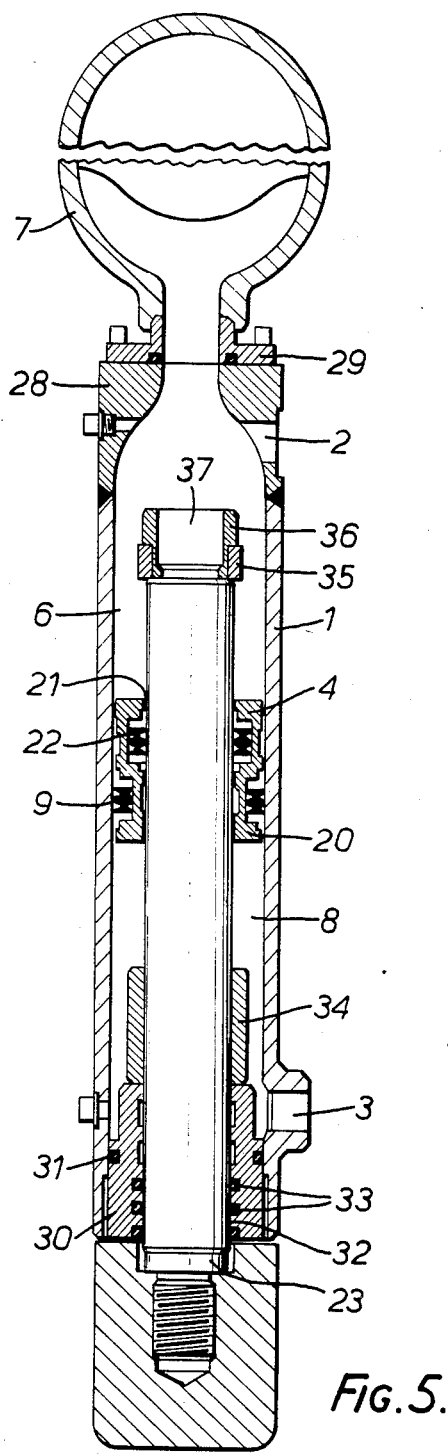
FIG. 5 shows, in an elevation and partial-section, an embodiment of a shock-absorbing jack according to the invention and of the type shown in FIG. 2.

FIG. 5 shows a detailed embodiment of the shock-absorbing jack according to FIGS. 2, 3 and 4. In this embodiment, the cylinder 1 terminates at one of its axial ends in a welded connection 28 to which the accumulator 7 is fixed axially in a leak-proof manner by means of a bolted collar 29 and which is provided with a lateral passage forming the first inlet 2. At its other axial end, the cylinder 1 carries a plug 30 threaded into the cylinder 1 and provided with an outer sealing ring 31. This plug 30 has an inner passage 32 for the actuated rod 23 and inner sealing rings 33 to ensure leak-proofing relative to the actuated rod 23. A lateral connection piece carried by the cylinder 1 forms the second inlet 3.

The piston 20 slides in the cylinder 1 and is sealed thereto by a sealing gasket 9 comprising, for example, segments of synthetic resin, and slides relative to the actuated rod 23 and is sealed thereto by a sealing gasket 22 comprising, for example, similarly, of segments of synthetic resin. A ring 34 freely surrounding the actuated rod 23 and located above the plug 30 limits the stroke of the piston 20 in the direction to extend the rod 23.

The enlarged head 24 of the actuated rod 23 is formed by a collar 35 retained by a nut 36 threaded on the end 37 of the actuated rod 23.

There is thus provided a shock-absorbing jack in which there is no pressure drop in the second chamber in the event of a shock applied to the actuated rod.

What is claimed is:

1. A double-acting hydraulic jack for installation and use underwater and including a cylinder (1), a piston (20) slidably and sealingly disposed in said cylinder and defining therewith a first actuating chamber (6) on one side of said piston and a second actuating chamber (8) on the other side of said piston, a first inlet (2) for supplying actuating liquid to said first chamber, a second inlet (3) for supplying actuating liquid to said second chamber, an accumulator (7) of elastically variable volume, means connecting said accumulator to said first chamber, and an actuated rod (23) associated with said piston and extending axially through the second chamber and outwardly of the cylinder through a liquid sealing aperture (10) in one end thereof, characterized by: means for preventing abrupt pressure drops in the second chamber due to shocks in a retraction direction being applied to the piston rod to thereby avoid the breach of said second chamber and the attendant inflow of surrounding water, said preventing means comprising an axial passage (21) defined in the piston, the rod extending slidably and sealingly through the passage with one end thereof projecting into the first chamber, an enlarged head (24) fixed to said one end of the rod and extending radially outwardly therefrom to retain the rod within the piston passage, and the remainder of the rod being smoothly cylindrical without any radial enlargements or limitations to its free and unrestricted sliding travel within the piston passage throughout the entire length of the rod inside the cylinder, whereby shocks applied to the rod in the retraction direction thereof and externally of the cylinder displace the rod within the piston but not the piston within the cylinder, with the decreased volume within the first chamber due to the further extension of the rod thereinto being compensated by an attendantly decreased volume within the accumulator.

* * * * *